United States Patent
Yun et al.

(10) Patent No.: US 9,116,343 B2
(45) Date of Patent: Aug. 25, 2015

(54) DISPLAY SUBSTRATE, DISPLAY APPARATUS HAVING THE SAME AND METHOD OF MANUFACTURING THE SAME

(75) Inventors: Sung-Sik Yun, Suwon-Si (KR); Jae-Byung Park, Seoul (KR); Jin-Seob Byun, Seoul (KR); Hyun-Min Cho, Seoul (KR); Yu-Kwan Kim, Incheon (KR)

(73) Assignee: SAMSUNG DISPLAY CO., LTD. (KR)

( * ) Notice: Subject to any disclaimer, the term of this patent is extended or adjusted under 35 U.S.C. 154(b) by 696 days.

(21) Appl. No.: 13/343,250

(22) Filed: Jan. 4, 2012

(65) Prior Publication Data
US 2012/0236385 A1    Sep. 20, 2012

(30) Foreign Application Priority Data

Mar. 18, 2011    (KR) .................. 10-2011-0024267

(51) Int. Cl.
*G02B 5/28* (2006.01)
*G02B 26/02* (2006.01)
*G02B 5/08* (2006.01)

(52) U.S. Cl.
CPC ............... *G02B 26/02* (2013.01); *G02B 5/085* (2013.01)

(58) Field of Classification Search
CPC .. G02B 26/001; G02B 26/02; G02B 26/0841; G02B 5/285; G02B 1/111; G02B 5/28; G02B 1/11; G02B 5/26; G02B 6/29361; G02B 1/116; G02B 26/0833; G02B 5/20; G02B 5/287; G02B 5/288; G02B 6/0055; G02B 2006/12104; G02B 2006/12109; G02B 26/08; G02B 26/101; G02B 5/0284; G02B 5/08; G02B 5/0808; G02B 5/0833; G02B 5/085; G02B 5/22; G02B 5/3041; G02F 1/133502; G02F 1/133553; G02F 1/133536; G02F 1/136209; G02F 1/21
See application file for complete search history.

(56) References Cited

U.S. PATENT DOCUMENTS

| | | | | |
|---|---|---|---|---|
| 6,493,052 B1 * | 12/2002 | Satake et al. | ................ | 349/114 |
| 2005/0207002 A1 * | 9/2005 | Liu et al. | .................... | 359/359 |
| 2008/0151357 A1 * | 6/2008 | Hagood et al. | ............. | 359/298 |
| 2008/0278798 A1 * | 11/2008 | Hagood et al. | ............. | 359/298 |
| 2009/0244678 A1 * | 10/2009 | Hagood et al. | ............. | 359/230 |

FOREIGN PATENT DOCUMENTS

| | | |
|---|---|---|
| JP | 3852306 A | 9/2006 |
| WO | 03048836 A2 | 6/2003 |
| WO | 2008091339 A2 | 7/2008 |
| WO | 2009015231 A1 | 1/2009 |

* cited by examiner

*Primary Examiner* — Derek S Chapel
(74) *Attorney, Agent, or Firm* — Cantor Colburn LLP

(57) ABSTRACT

A display substrate includes a base substrate, a high reflective layer, a metal light reflective layer and a low reflective layer. The high reflective layer is on the base substrate, and includes a high refractive layer and a low refractive layer which alternate with each other. The high refractive layer has a first refractive index, and the low refractive layer has a second refractive index smaller than the first refractive index. The metal light reflective layer is between the high reflective layer and the low reflective layer, and reflects a light. The low reflective layer comprises a light absorbing layer which absorbs a light, and at least one insulating layer. Accordingly, a light utilizing efficiency and a display quality may be increased.

21 Claims, 6 Drawing Sheets

DISPLAY SUBSTRATE, DISPLAY APPARATUS HAVING THE SAME AND METHOD OF MANUFACTURING THE SAME

CROSS REFERENCE TO RELATED APPLICATION

This application claims priority under 35 U.S.C. §119 to Korean Patent Application No. 2011-0024267, filed on Mar. 18, 2011 in the Korean Intellectual Property Office (KIPO), the contents of which are herein incorporated by reference in their entireties.

BACKGROUND OF THE INVENTION

1. Field of the Invention

Example embodiments of the invention relate to a display substrate, a display apparatus having the display substrate and a method of manufacturing the display substrate. More particularly, example embodiments of the invention relate to a display substrate based on a micro electro-mechanical system ("MEMS"), a display apparatus having the display substrate and a method of manufacturing the display substrate.

2. Description of the Related Art

Conventionally, display apparatuses such as a liquid crystal display ("LCD"), a plasma display panel ("PDP"), and a field emission display ("FED") have been used, and a research on applying a new technology in the display apparatus field have been increased. Demands for the display apparatus based on a micro electro-mechanical system ("MEMS") which has high light utilizing efficiency and low power consumption has been increased. A MEMS device is formed on a substrate such as a silicon substrate and a glass substrate, as a microstructure, and includes a driving unit outputting a mechanical driving power, and a semiconductor integrated circuit controlling the driving unit.

The display apparatus based on the MEMS includes a first substrate on which a reflective layer including at least one opening slot is disposed, and a second substrate having a shutter assembly including a digital micro shutter ("DMS") which opens and closes the opening slot. The reflective layer may include a high reflective layer having a high reflectance and a low reflective layer having a low reflectance.

The high reflective layer may have a stacked structure to embody a high reflectance, but the reflectance may be decreased according to an emitting wavelength band, due to an error of a stacked thickness occurring in depositing a stacked layer.

In addition, the low reflective layer may be formed using a chrome (Cr)-based material to embody a low reflectance. In this case, an etching chamber may be polluted due to particles generated during an etching process. Furthermore, using a heavy metal such as chrome (Cr) may be restricted according to increasing demands for an environment-friendly product in the industrial field.

When the reflective layer is relatively thick due to the stacked structure, an error may be increased during a process of forming the opening slots.

BRIEF SUMMARY OF THE INVENTION

Example embodiments of the invention provide a display substrate capable of enhancing a light utilizing efficiency and a display quality.

Example embodiments of the invention also provide a display apparatus having the display substrate.

Example embodiments of the invention also provide a method of manufacturing the display substrate.

According to an example embodiment, a display substrate includes a base substrate, a high reflective layer, a metal light reflective layer and a low reflective layer. The high reflective layer is on the base substrate, and includes a high refractive layer and a low refractive layer which alternate with each other. The high refractive layer has a first refractive index, and the low refractive layer has a second refractive index smaller than the first refractive index. The metal light reflective layer is between the high reflective layer and the low reflective layer, and reflects light. The low reflective layer includes a light absorbing layer which absorbs the light, and at least one insulating layer.

In one example embodiment, the high reflective layer may include first, second and third high reflectance layers and first, second and third low reflectance layers. The first high refractive layer has the first refractive index, and is on the base substrate. The first low refractive layer has the second refractive index, and is on the first high refractive layer. The second high refractive layer has the first refractive index, and is on the first low refractive layer. The second low refractive layer has the second refractive index, and is on the second high refractive layer. The third high refractive layer has the first refractive index, and is on the second low refractive layer. The third low refractive layer has the second refractive index, and is on the third high refractive layer.

In one example embodiment, each of the first, second and third high refractive layers may include silicon nitride ($SiN_x$).

In one example embodiment, a thickness of the first high refractive layer may be larger than a thickness each of the second and third high refractive layers.

In one example embodiment, the low reflective layer may include first and second insulating layers. The first insulating layer may have the second refractive index, and be beneath the light absorbing layer. The second insulating layer may have the second refractive index, and be on the light absorbing layer.

In one example embodiment, each of the first and second insulating layers may include silicon oxide ($SiO_x$).

In one example embodiment, the light absorbing layer may include titanium (Ti).

In one example embodiment, the first refractive index may be about 2.3, and the second refractive index may be about 1.46.

In one example embodiment, the display substrate may further include an opening slot and a contact hole. The opening slot extends through the high reflective layer, the metal light reflective layer and the low reflective layer, in a pixel area of the display substrate. The contact hole may extend through the low reflective layer and expose the metal light reflective layer, outside of the pixel area.

In one example embodiment, the display substrate may further include a bump on the low reflective layer.

According to another example embodiment, a display apparatus includes first and second substrate, an insulating material and backlight unit. The first substrate includes a first base substrate, a high reflective layer, a metal light reflective layer, a low reflective layer and an opening slot which exposes the first base substrate. The high reflective layer is on the base substrate, and includes a high refractive layer and a low refractive layer which alternate with each other. The high refractive layer has a first refractive index, and the low refractive layer has a second refractive index smaller than the first refractive index. The metal light reflective layer is between the high reflective layer and the low reflective layer, and reflects light. The low reflective layer includes a light absorbing layer which absorbs the light, and at least one insulating layer. The second substrate includes a shutter which opens and closes the opening slot. The insulating material is between the first and second substrates. The backlight unit is under the first substrate, and generates and emits the light.

In one example embodiment, the second substrate may include a second base substrate, a driving element, an insulating layer and a shutter assembly. The driving element may apply an electronic signal to move the shutter which opens or closes the opening slot. The insulating layer may cover the second base substrate and the driving element. The shutter assembly may be on the insulating layer, and may include the shutter and an electrode portion. The electrode portion may be on opposing end portions of the shutter to move the shutter which opens and closes the opening slot.

In one example embodiment, the opening slot extends through the high reflective layer, the metal light reflective layer and the low reflective layer, in a pixel area of the first substrate.

According to still another example embodiment, in a method of manufacturing a display substrate, a high reflective layer including a high refractive layer and a low refractive layer which alternate with each other, is formed on a base substrate. The high refractive layer has a first refractive index, and the low refractive layer has a second refractive index smaller than the first refractive index. The metal light reflective layer which reflects a light, is formed on the high reflective layer. The low reflective layer including a light absorbing layer which absorbs the light, and at least one insulating layer, is formed on the metal light reflective layer.

In one example embodiment, the forming the high reflective layer may include forming a first high refractive layer having the first refractive index on the base substrate, forming a first low refractive layer having the second refractive index on the first high refractive layer, forming a second high refractive layer having the first refractive index on the first low refractive layer, forming a second low refractive layer having the second refractive index on the second high refractive layer, forming a third high refractive layer having the first refractive index on the second low refractive layer, and forming a third low refractive layer having the second refractive index on the third high refractive layer.

In one example embodiment, the forming the first, second and third high refractive layers may include forming a silicon nitride ($SiN_x$) layer using a plasma enhanced chemical vapor deposition ("PECVD") method, and the forming the first, second and third low refractive layers may include forming a silicon oxide ($SiO_x$) layer using the PECVD method.

In one example embodiment, the forming the low reflective layer may include forming a first insulating layer having the second refractive index on the metal light reflective layer, forming the light absorbing layer on the first insulating layer, and forming a second insulating layer having the second refractive index on the light absorbing layer.

In one example embodiment, the forming the light absorbing layer may include forming a titanium (Ti) layer using a plasma sputter deposition method, and forming the first and second insulating layers may include a silicon oxide ($SiO_x$) layer using the PECVD method.

In one example embodiment, the method of manufacturing the display substrate may further include removing a first portion of the metal light reflective layer and the low reflective layer in a pixel area to form a first slot.

In one example embodiment, the forming the first slot may include forming a first photoresist film on the low reflective layer, patterning an area of the first photoresist film corresponding to the first slot to form a first pattern, etching the low reflective layer and the metal light reflective layer using the first pattern, and removing the first photoresist film.

In one example embodiment, the method of manufacturing the display substrate may further include at the same time, removing the high reflective layer to form a second slot through which the base substrate is exposed in the first slot, and removing a second portion of the low reflective layer to form a contact hole through which the metal light reflective layer is exposed.

In one example embodiment, the forming the second slot and the contact hole at the same time may include forming a second photoresist film on the first slot and the low reflective layer, patterning areas of the second photoresist film corresponding to the second slot and the contact hole to form a second pattern, etching the high reflective layer on which the first slot is formed, and the low reflective layer using the second pattern, and removing the second photoresist film.

In one example embodiment, the method of manufacturing the display substrate may further include forming a bump on the low reflective layer.

According to example embodiments, a light utilizing efficiency and a display quality may be increased.

For the high reflective layer, double layers of silicon nitride ($SiN_x$) and silicon oxide ($SiO_x$) are deposited at three times to increase a reflectance, and a thickness of a first silicon nitride ($SiN_x$) layer is deposited larger than a thickness of each of the other silicon nitride ($SiN_x$) layers, so that an area in which the reflectance is uniform may be increased in a visible-ray region. Accordingly, even if a thickness error occurs during a manufacturing process, the reflectance may be less changed.

In addition, heavy metals such as chrome (Cr) are replaced with a multi-layered film formed using silicon nitride ($SiN_x$) and titanium (Ti), so that a low reflectance is more uniformized and pollution due to harmful heavy metals may be decreased.

In addition, etching a thick stacked reflective layer to form an opening slot is divided into two processes or steps, and the contact hole is patterned at the same time of forming the opening slot in a second etching, so that a processing error may be decreased.

BRIEF DESCRIPTION OF THE DRAWINGS

The above and other features of the invention will become more apparent by describing in detailed example embodiments thereof with reference to the accompanying drawings, in which.

DETAILED DESCRIPTION OF THE INVENTION

Figure 1:
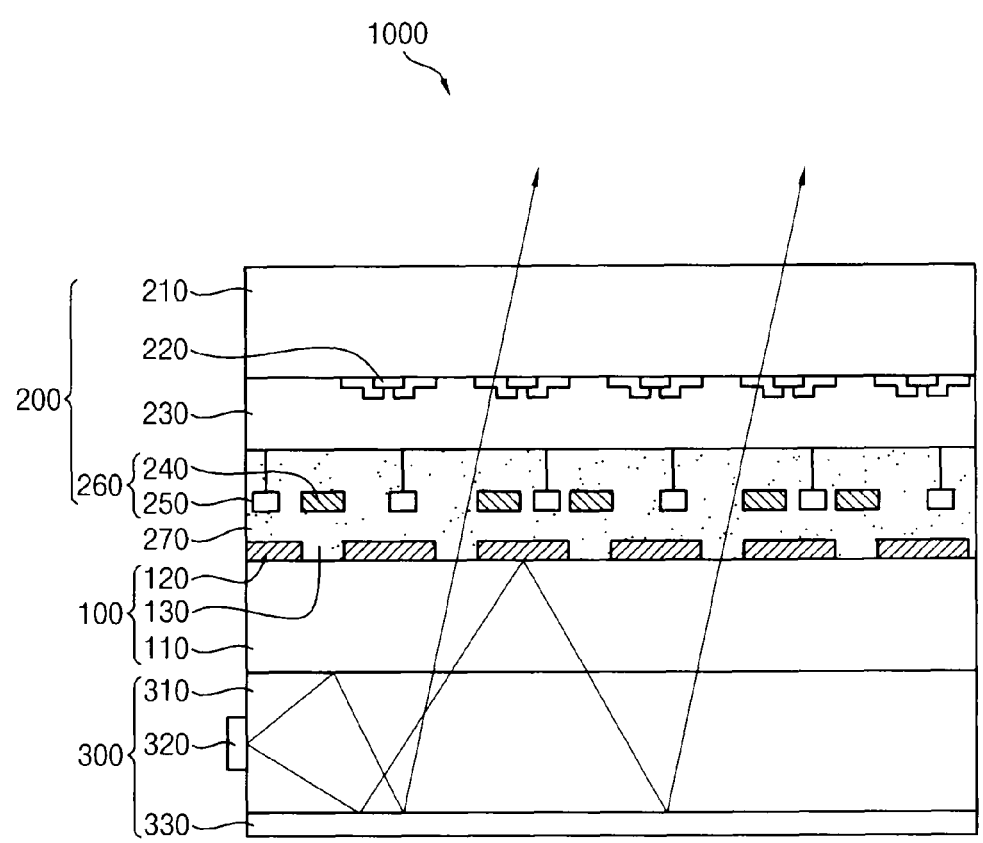
FIG. 1 is a cross-sectional view illustrating an example embodiment of a display apparatus according to the invention.

The invention is described more fully hereinafter with reference to the accompanying drawings, in which example embodiments of the invention are shown. This invention may, however, be embodied in many different forms and should not be construed as limited to the example embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" and "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or example language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, example embodiments of the invention will be explained in detail with reference to the accompanying drawings.

FIG. 1 is a cross-sectional view illustrating an example embodiment of a display apparatus according to the invention.

Referring to FIG. 1, the display apparatus 1000 according to the illustrated example embodiment includes a first substrate 100, and a second substrate 200 facing the first substrate 100.

The first substrate 100 includes a first base substrate 110 and a stacked reflective layer 120.

The first base substrate 110 may include a transparent insulating material.

The stacked reflective layer 120 is on the first base substrate 110. The stacked reflective layer 120 reflects a light provided from a backlight unit 300, and increases a light utilizing efficiency. In addition, the stacked reflective layer 120 blocks or absorbs the light passing through the second substrate 200, and reduced or effectively prevents a contrast ratio of the display apparatus 1000 from being decreased due to a redundant reflective light. The stacked reflective layer 120 includes an opening slot 130 in a pixel area. The light provided from the backlight unit 300 is provided to the second substrate 200 through the opening slot 130. The stacked reflective layer 120 may include a plurality of opening slots 130 which extend completely through a thickness of the reflective layer 120.

The second substrate 200 may include a second base substrate 210, a driving element 220, an insulating layer 230 and a shutter assembly 260. The second substrate 200 may include a plurality of driving elements 220 on the second base substrate 210, as illustrated in FIG. 1.

The second base substrate 210 may include a transparent insulating material.

The driving element 220 is on the second base substrate 210. The driving element may be electrically connected to a plurality of signal lines (now shown). The driving element 220 provides a signal for driving the shutter assembly, and may include a switching element (not shown) and a capacitor (not shown), etc. The switching element may be a thin film transistor ("TFT") which is turned on in response to a gate signal.

The insulating layer 230 is on the second base substrate 210 including the driving element 220 and the signal lines thereon. The insulating layer 230 may contact the driving element 220, the signal lines and/or the second base substrate 210.

The shutter assembly 260 may be directly on the insulating layer 230 which is on the second base substrate 210. The shutter assembly 260 may include a shutter 240, and an electrode portion 250 which is on each of opposing sides of the shutter 240 and moves the shutter 240 toward a left-side or a right-side in the cross-sectional view of FIG. 1. The electrode portion 250 may include a plurality of electrodes which are respectively between adjacent shutter assemblies 260.

The shutter 240 is in an area corresponding to the opening slot 130 of the stacked reflective layer 120, and opens or closes the opening slot 130 by moving toward the left-side or the right-side. The electrode portion 250 forms an electric field between two electrodes according to an electric signal generated from the driving element 220, so that the shutter 240 may move in a horizontal direction substantially parallel with the second base substrate 210. When the shutter 240 is aligned with and/or completely overlaps the opening slot 130, the opening slot 130 is closed. When the shutter 240 is not aligned with or does not completely overlap the opening slot 130, the opening slot 130 is open. When the opening slot 130 of the stacked reflective layer 120 opens, the light generated from the backlight unit 300 is transmitted through the reflective layer 120 via the opening slot 130, and when the opening slot 130 is closed, the light is blocked and is not transmitted through the reflective layer 120.

The display apparatus 1000 may further include an insulating fluidic material 270 between the first and second substrates 100 and 200. In one example embodiment, for example, the insulating fluidic material may be oil.

The backlight unit 300 may include a light guide plate 310, a light source unit 320 and a reflective sheet 330.

The light guide plate 310 is under the first substrate 100. The light guide plate 310 may have a plate shape, and the light source unit 320 may be on a side surface of the light guide plate 310. The light source unit 320 generates and emits a light to the light guide plate 310. The light source unit 320 may include a plurality of color light sources generating first, second and third color light. In one example embodiment, for example, the color light sources may include a red light emitting diode, a green light emitting diode and a blue light emitting diode. The reflective sheet 330 is under the light guide plate 310. The reflective sheet 330 reflects the light incident onto a lower surface of the light guide plate 310 as illustrated in FIG. 1.

Although not shown in FIG. 1, the backlight unit 300 may be a direct-illumination type backlight unit in which a light source unit is under (e.g., overlaps) a display substrate. In this case, the light guide plate 310 may be omitted.

Figure 2A:
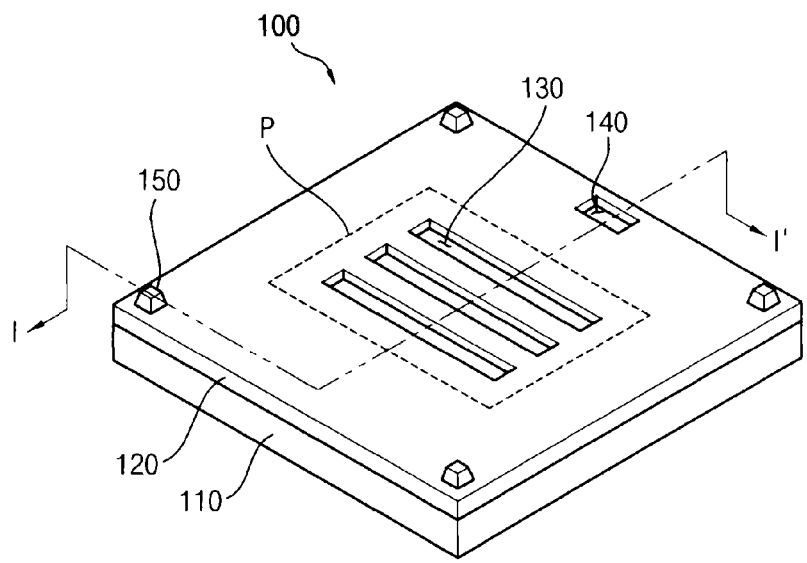
FIG. 2A is a perspective view illustrating an example embodiment of a first substrate shown in FIG. 1.
Figure 2B:
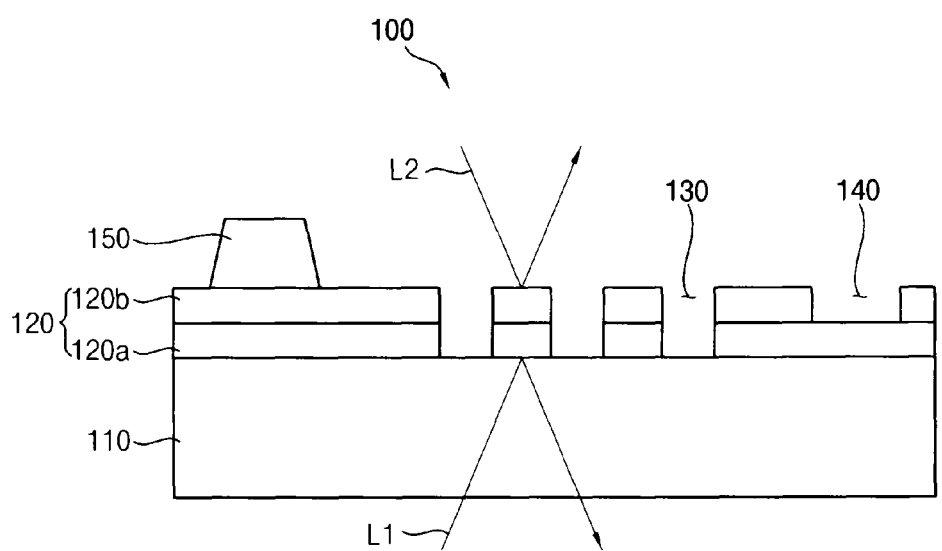
FIG. 2B is a cross-sectional view taken along line I-I' of the first substrate of FIG. 2A.

FIG. 2A is a perspective view illustrating an example embodiment of a first substrate shown in FIG. 1. FIG. 2B is a cross-sectional view taken along line I-I' of the first substrate of FIG. 2A.

Referring to FIGS. 2A and 2B, the stacked reflective layer 120 on the first base substrate 110 includes a high reflective layer 120a and a low reflective layer 120b.

The high reflective layer 120a has a high reflectance, and reflects a light L1 incident from the bottom thereof with a relatively high reflective rate. In the illustrated embodiment, for example, the high reflective layer 120a reflects a light incident from the backlight unit 300, and the light is recycled between the high reflective layer 120a and the reflective sheet 330 of the backlight unit 300, so that a light utilizing efficiency may be increased. In addition, the light utilizing efficiency may be determined as a reflectance of the high reflective layer 120a.

The low reflective layer 120b has a low reflectance, and reflects a light L2 incident from the top thereof with a relatively lower reflective rate. The low reflectance means that the low reflective layer 120b both blocks and absorbs the light L2. In the illustrated embodiment, for example, the low reflective layer 120b absorbs a light incident from the second substrate 200, and also reduces or effectively prevents leakage of the light from between the shutter 240 and opening slot 130, so that a decrease in contrast ratio of the display apparatus 1000 due to a needless reflective light may be reduced or effectively prevented.

The stacked reflective layer 120 includes the opening slot 130 in the pixel area P. The pixel area P may include a plurality of opening slots 130. The stacked reflective layer 120 is absent in the opening slot 130, so that the first base substrate 110 is exposed through the opening slot 130.

In addition, the stacked reflective layer 120 includes a contact hole 140 in a peripheral area thereof. The low reflective layer 120b is absent in the contact hole 140, so that the high reflective layer 120a is exposed through the contact hole 140.

In addition, the first substrate 100 may further include a bump 150 on the stacked reflective layer 120. The bump 150 is between adjacent pixels or pixel areas P, and maintains a cell gap between the first and second substrates 100 and 200.

Figure 3:
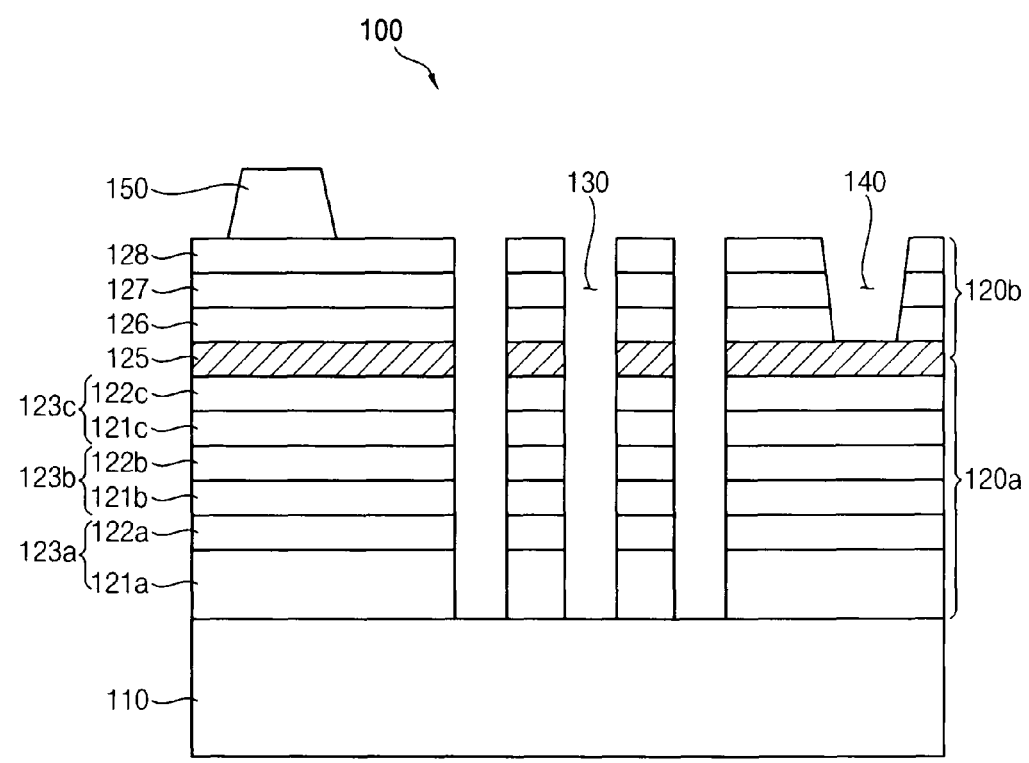
FIG. 3 is a cross-sectional view illustrating an example embodiment of a stacked structure of the first substrate shown in FIG. 2B.

FIG. 3 is a cross-sectional view illustrating an example embodiment of a stacked structure of the first substrate shown in FIG. 2B.

Referring to FIG. 3, the stacked reflective layer 120 includes the high reflective layer 120a, a metal light reflective layer 125 and the low reflective layer 120b. The metal light reflective layer 125 may be shared by the high and low reflective layers 120a and 120b.

The high reflective layer 120a is directly on the first base substrate 110, and a high refractive layer having a first refractive index and a low refractive layer having a second refractive index smaller than the first refractive index are alternately stacked on the first base substrate 110. In the illustrated embodiment, for example, the high reflective layer 120a may include first high and low refractive layers 121a and 122a, second high and low refractive layers 121b and 122b, and third high and low refractive layers 121c and 122c.

The first high refractive layer 121a is directly on an upper surface of the base substrate 110, and has the first refractive index. The first low refractive layer 122a is directly on the first high refractive layer 121a, and has the second refractive index. The second high refractive layer 121b is directly on the first low refractive layer 122a, and has the first refractive index. The second low refractive layer 122b is directly on the second high refractive layer 121b, and has the second refractive index. The third high refractive layer 121c is directly on the second low refractive layer 122b, and has the first refractive index. The third low refractive layer 122c is directly on the third high refractive layer 121c, and has the second refractive index.

The first high and low refractive layers 121a and 122a form a first refractive layer pair 123a, the second high and low refractive layers 121b and 122b form a second refractive layer pair 123b, and the third high and low refractive layers 121c and 122c form a third refractive layer pair 123c. In the illustrated embodiment, for example, the high reflective layer 120a has a stacked structure in which a layer having relatively high refractive index and a layer having relatively low refractive index are alternately stacked. In one embodiment, for example, the first refractive index is about 2.3 and the second refractive index is about 1.46.

A reflectance of the high reflective layer 120a may be increased using the stacked structure and a difference between refractive indexes of refractive layers. With the alternating layers having different refractive indices, for example, the high reflective layer 120a makes constructive interference of the light passing through the refractive layers. Further with the alternating layers having different refractive indices, for example, phases of the light passing through the layers overlap with each other due to the constructive interference, so that the light may be reflected by the metal light reflective layer 125 having the relatively higher reflective rate.

According to the illustrated example embodiment, the high reflective layer 120a includes the first, second and third refractive layer pairs 123a, 123b, and 123c, but is not limited thereto. Alternatively, the high reflective layer 120a may include only the first and second refractive layer pairs 123a and 123b.

A thickness of the first high refractive layer 121a may be larger than a thickness of the second high refractive layer 121b, where the thicknesses are taken perpendicular to the first base substrate 110. In one example embodiment, for example, the thickness of the first high refractive layer 121a is between about 1.7 and about 2.3 times larger than the thickness of the second high refractive layer 121b. Accordingly, the reflectance with respect to an emitting wavelength band may be uniformly formed. Thus, a range having the uniform reflectance is increased, so that a change in the reflectance may be decreased even if an error of a thickness occurs during a manufacturing process.

The metal light reflective layer 125 is directly on the high reflective layer 120a, and reflects the light. In the illustrated embodiment, for example, the metal light reflective layer 125 reflects an inner light, which is incident from the backlight unit 300 and passes through the high reflective layer 120a, due to having the relatively higher reflective rate. The first, second and third high refractive layers 121a, 121b and 121c may include silicon nitride (SiNx), and the first, second and third low refractive layers 122a, 122b and 122c may include silicon oxide (SiOx). In addition, the metal light reflective layer 125 may include aluminum (Al).

In addition, for example, the thickness of the first high refractive layer 121a may be about 120 nanometers (nm), a thickness of each of the second and third high refractive layer 121b and 121c may be about 58 nm, and a thickness of each of the first, second and third low refractive layer 122a, 122b and 122c may be about 85 nm.

The low reflective layer 120b is directly on the metal light reflective layer 125, and includes a light absorbing layer and at least one insulating layer.

Referring to FIG. 3, for example, the low reflective layer 120b may include a light absorbing layer 127, and first and second insulating layers 126 and 128.

The light absorbing layer 127 is on the metal light reflective layer 125, and absorbs the light. In the illustrated embodiment, for example, the low reflective layer 120b may absorb an external light provided through the second substrate 200, and may absorb the light leaking through a gap between the shutter 240 and the opening slot 130 toward the low reflective layer 120b. In one embodiment, for example, the light absorbing layer 127 may include titanium (Ti).

The first and second insulating layers 126 and 128 are beneath the light absorbing layer 127 and above the light absorbing layer 127, respectively, and each may have the second refractive index. Each of the first and second insulating layers 126 and 128 may include silicon oxide (SiOx). In one embodiment, for example, a thickness of each of the first and second insulating layers 126 and 128 may be about 85 nm.

Accordingly, the low reflective layer 120b increases light absorbing efficiency, and decreases a reflectance. With the above structure, for example, the low reflective layer 120b makes constructive interference of light passing through the first and second insulating layers 126 and 128. Further, phases of light passing through the layers of the low refractive layer 120b overlap with each other due to the constructive interference, so that the light may be reflected by the metal light reflective layer 125 having the relatively higher reflective rate.

In addition, a low reflectance is more uniformized over an entire emitting light wavelength band by the low reflective layer 120b. In addition, regarding a material for the light absorbing layer 127, heavy metals such as chrome (Cr) are replaced with a multi-layer film formed using silicon nitride (SiNx) and titanium (Ti), so that pollution due to harmful heavy metals may be decreased.

According to the illustrated example embodiment, the first and second insulating layers 126 and 128 are beneath the light absorbing layer 127 and above the light absorbing layer 127 respectively, but the invention not limited thereto, and alternatively, not less than three insulating layers may be included, or only one insulating layer may be on the light absorbing layer 127.

Figure 4A:
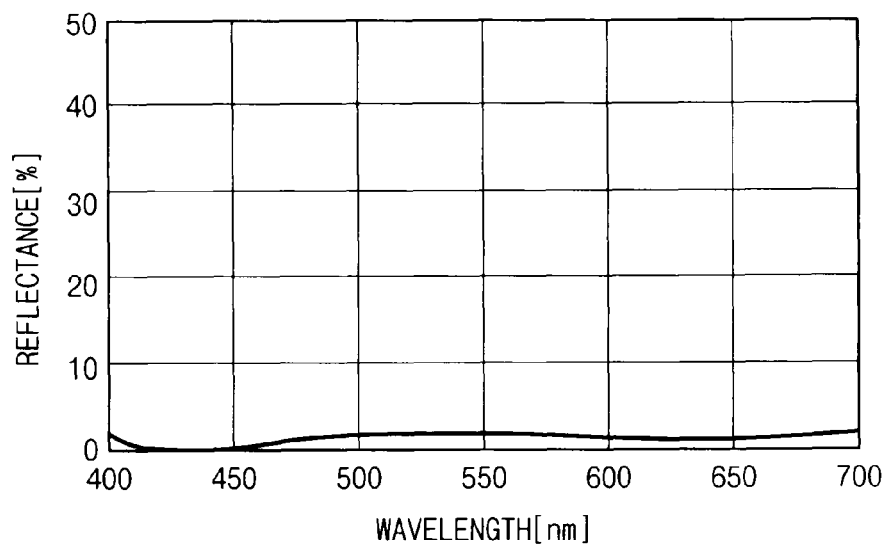
FIG. 4A is a graph showing a reflective characteristic of an example embodiment of a low reflective layer shown in FIG. 3.
Figure 4B:
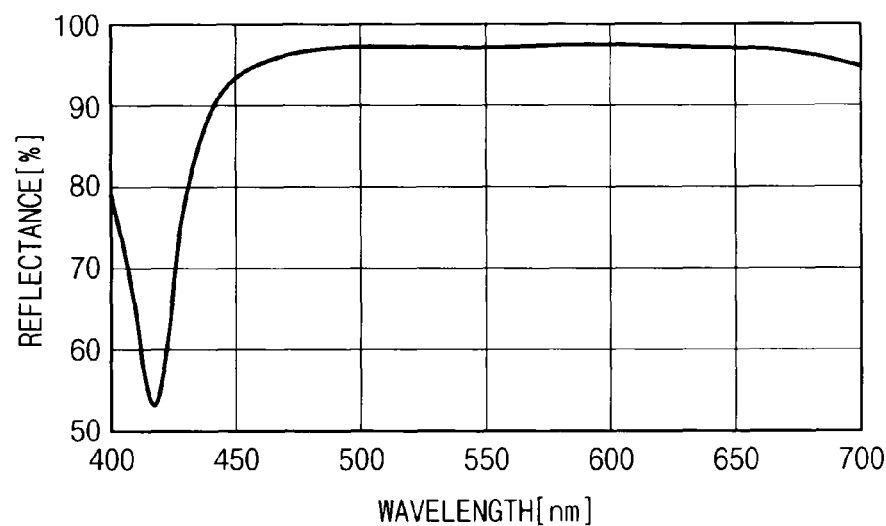
FIG. 4B is a graph showing a reflective characteristic of an example embodiment of a high reflective layer shown in FIG. 3.

FIG. 4A is a graph showing a reflective characteristic of the low reflective layer shown in FIG. 3. FIG. 4B is a graph showing a reflective characteristic of the high reflective layer shown in FIG. 3.

According to the illustrated example embodiment of FIG. 3, material, a refractive index and a thickness of each layer are listed in Table 1.

TABLE 1

| Layer | Material | Refractive index | Thickness (nm) |
|---|---|---|---|
| Second insulating layer | SiO$_2$ | 1.46 | 85 |
| Light absorbing layer | Ti | — | 15 |
| First insulating layer | SiO$_2$ | 1.46 | 85 |
| (Metal) Light reflective layer | Al | — | 200 |
| Third low refractive layer | SiO$_2$ | 1.46 | 85 |
| Third high refractive layer | SiNx | 2.3 | 58 |
| Second low refractive layer | SiO$_2$ | 1.46 | 85 |
| Second high refractive layer | SiNx | 2.3 | 58 |
| First low refractive layer | SiO$_2$ | 1.46 | 85 |
| First high refractive layer | SiNx | 2.3 | 120 |

Regarding the stacked layer 120 having layers of the material, the refractive index and the thickness shown in Table 1, a reflective characteristic of the low reflective layer 120b in percent (%) versus light wavelengths in nm is shown in FIG. 4A. Referring to FIG. 4A, the low reflective layer 120b may maintain approximately 2% of a reflectance over an entire light emitting wavelength band.

In case of a conventional low reflective layer formed using chrome (Cr), a low reflective characteristic is excellent in a central wavelength band from about 550 nm to about 650 nm. However, the reflectance in the conventional low reflective layer rises as a range is deviated from the central wavelength band, so that the reflectance is not uniform over an entire of the light emitting wavelength band. Thus, according to the illustrated example embodiment, the low reflective layer 120b may maintain approximately 2% of the reflectance over an entire of the light emitting wavelength band, so that display quality may be more uniform.

Regarding the stacked layer 120 having layers of the material, the refractive index and the thickness shown in Table 1, a reflective characteristic of the high reflective layer 120a in percent (%) versus light wavelengths in nm is shown in FIG. 4B. Referring to FIG. 4B, the high reflective layer 120a may maintain approximately 97% of a reflectance all over the light emitting wavelength band over substantially an entire of light emitting wavelength band except for a low wavelength band from about 400 nm to about 450 nm.

In case of a conventional high reflective layer, a high reflective characteristic is excellent in the central wavelength band which is from about 500 nm to about 600 nm. However, the reflectance of the conventional high reflective layer decreases as the range is deviated from the central wavelength band, so that the reflectance is not uniform over an entire of the light emitting wavelength band. Thus, according to the illustrated example embodiment, the high reflective layer 120a may maintain approximately 97% of the reflectance over substantially an entire of the light emitting wavelength band except for the low wavelength band, so that the display quality may be more uniform.

Although not shown in figures, a display apparatus according to another example embodiment may include a base substrate, a gate insulating layer, an optical absorbing layer and a gate metal layer. The base substrate according to the another example embodiment is substantially same as the second substrate 200 described with reference to FIG. 1, and the gate metal layer and a driving element are on the base substrate and are spaced apart from each other. The gate insulting layer is between the base substrate and the gate metal layer.

The gate metal layer reflects the light being incident thereto, so that the gate metal layer decreases the display quality of the display apparatus. According to the another example embodiment, the optical absorbing layer is between the gate insulating layer and the gate metal layer, so that a low reflective characteristic may be embodied. The optical absorbing layer includes a metal light absorbing layer absorbing the light, and at least one insulating layer. The metal light absorbing layer may include titanium (Ti), and the insulating layer may include a silicon oxide ($SiO_x$). In addition, a thickness of each of the metal light absorbing layer and the insulating layer may be changed according to a material of the gate metal layer, and a refractive index of the insulating layer.

According to still another example embodiment, the optical absorbing layer is between the base substrate and the gate insulating layer, so that a low reflective characteristic may be embodied. According to the still another example embodiment, the optical absorbing layer includes first and second metal light absorbing layers absorbing the light, and an insulating layer between the first and second metal light absorbing layers. The first and second metal light absorbing layers may include at least one of titanium (Ti), molybdenum (Mo), aluminum (Al), copper (Cu), chrome (Cr), molybdenum-tungsten (MoW) and aluminum-neodymium (AlNd). A thickness of each of the first and second metal light absorbing layers and the insulating layer may be changed according to a material of the first and second metal light absorbing layers and a refractive index of the insulating layer.

FIG. 5A to FIG. 5D are cross-sectional views illustrating an example embodiment a method of manufacturing the first substrate 100 shown in FIG. 3. A display substrate according to the illustrated example embodiment is substantially same as the first substrate 100 shown in FIG. 3. Accordingly, only one of three opening slots 130 on the first substrate 100 is shown in FIG. 5A to FIG. 5D for convenience.

Figure 5A:
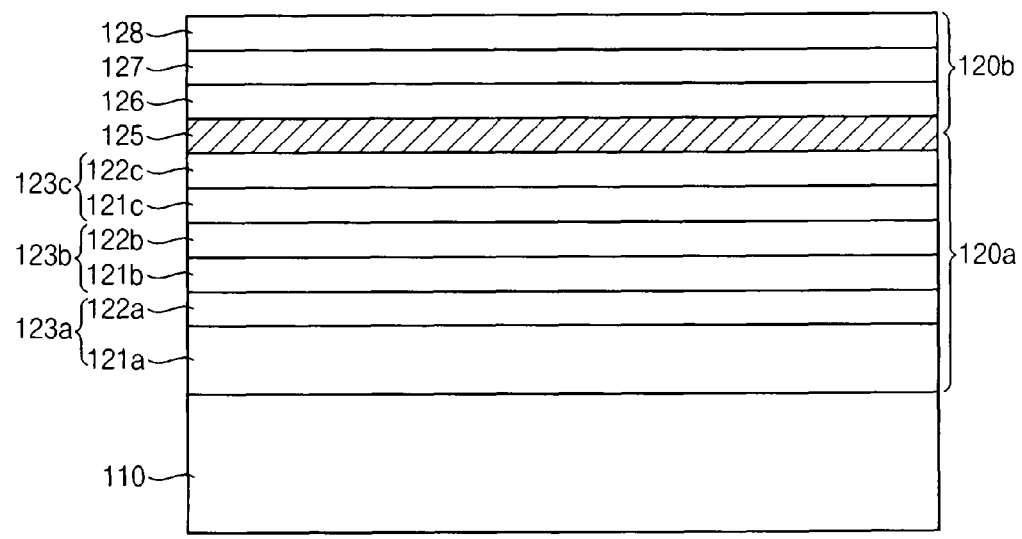
FIG. 5A to FIG. 5D are cross-sectional views illustrating an example embodiment of a method of manufacturing the first substrate shown in FIG. 3.

Referring to FIG. 5A, the stacked reflective layer 120 is formed on the first base substrate 110. The stacked reflective layer 120 includes the high reflective layer 120a, a metal light reflective layer 125 and the low reflective layer 120b. The high reflective layer 120a may include first high and low refractive layers 121a and 122a, second high and low refractive layers 121b and 122b, and third high and low refractive layers 121c and 122c. The low reflective layer 120b may include light absorbing layer 127, and first and second insulating layers 126 and 128. The high reflective layer 120a and the low reflective layer 120b may share the metal light reflective layer 125.

After the first base substrate 110 is cleaned, the first high refractive layers 121a including silicon nitride ($SiN_x$), and the first low refractive layers 122a including silicon oxide ($SiO_x$) are formed on the first base substrate 110 using a plasma enhanced chemical vapor deposition ("PECVD") method.

Here, a thickness of the first high refractive layer 121a may be larger than a thickness of the second high refractive layer 121b. In one embodiment, for example, the thickness of the first high refractive layer 121a is between about 1.7 and about 2.3 times larger than the thickness of the second high refractive layer 121b.

The second high refractive layers 121b including silicon nitride ($SiN_x$), and the second low refractive layer 122b including silicon oxide ($SiO_x$) are formed on the first low refractive layers 122 using the PECVD method. Then, the third high refractive layer 121c including silicon nitride ($SiN_x$), and the third low refractive layer 122c including silicon oxide ($SiO_x$) are formed sequentially on the second low refractive layer 122b.

The metal light reflective layer 125 is disposed directly on the third low refractive layer 122c. The metal light reflective layer 125 includes metal material such as aluminum (Al) or alloy thereof, and is formed using a sputtering method.

The first insulating layer 126 including silicon oxide ($SiO_x$) is formed on the metal light reflective layer 125 using the PECVD method. Then, the light absorbing layer 127 including titanium (Ti) is formed directly on the first insulating layer 126 using a plasma sputter deposition method. Then, the second insulating layer 128 including silicon oxide ($SiO_x$) is formed directly on the light absorbing layer 127 using the PECVD method.

In one embodiment, for example, the thickness of the first high refractive layer 121a is about 120 nm, a thickness of each of the second and third high refractive layer 121b and 121c is about 58 nm, and a thickness of each of the first, second and third low refractive layer 122a, 122b and 122c is about 85 nm.

According to the illustrated example embodiment, layers including silicon nitride ($SiN_x$), or silicon oxide ($SiO_x$) are formed by the PECVD method, and layers including aluminum (Al), or titanium (Ti) are formed by the method of plasma sputter deposition, but the invention is not limited thereto. Thus, the layers may be formed by other various methods.

Figure 5B:
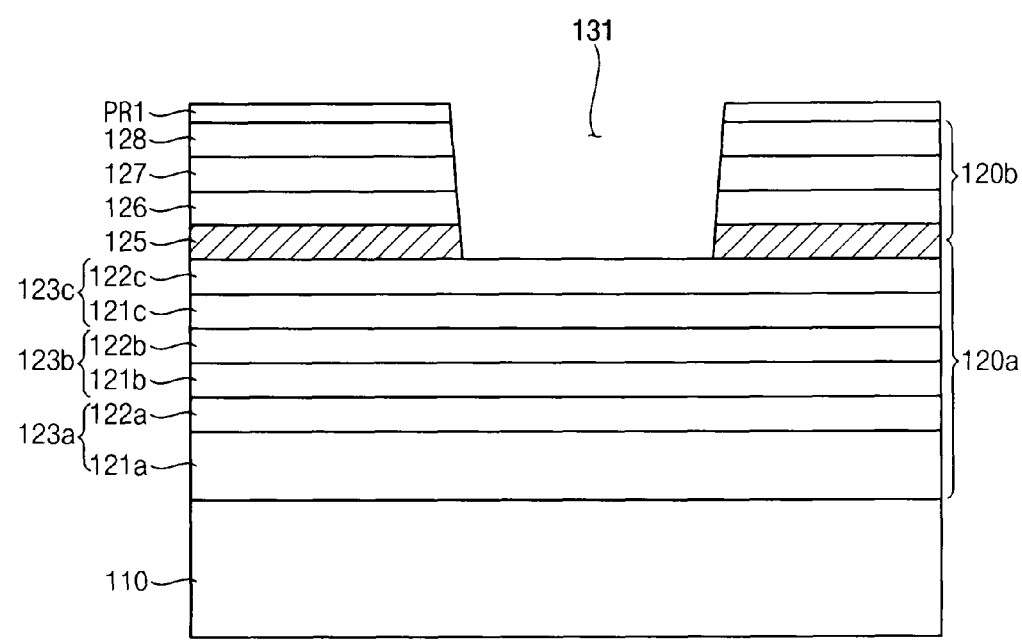

Referring to FIG. 5B, a portion of the metal light reflective layer 125 and the low reflective layer 120b are removed to form a first slot 131.

In the illustrated embodiment, for example, a first photoresist film PR1 is coated on the stacked reflective layer 120, and an area of the first photoresist film PR1 corresponding to the first slot 131 is patterned to form a first pattern. Here, the first slot 131 may be formed as plural.

The stacked reflective layer 120 is dry-etched using the first pattern. Here, portions of the second insulating layer 128, the light absorbing layer 127, the first insulating layer 126 and the metal light reflective layer 125 are removed from the stacked reflective layer 120 to expose the third low refractive layer 122c. Then, the first photoresist film PR1 is processed by an ashing process and a strip process, so that the first photoresist film PR1 is removed.

Figure 5C:
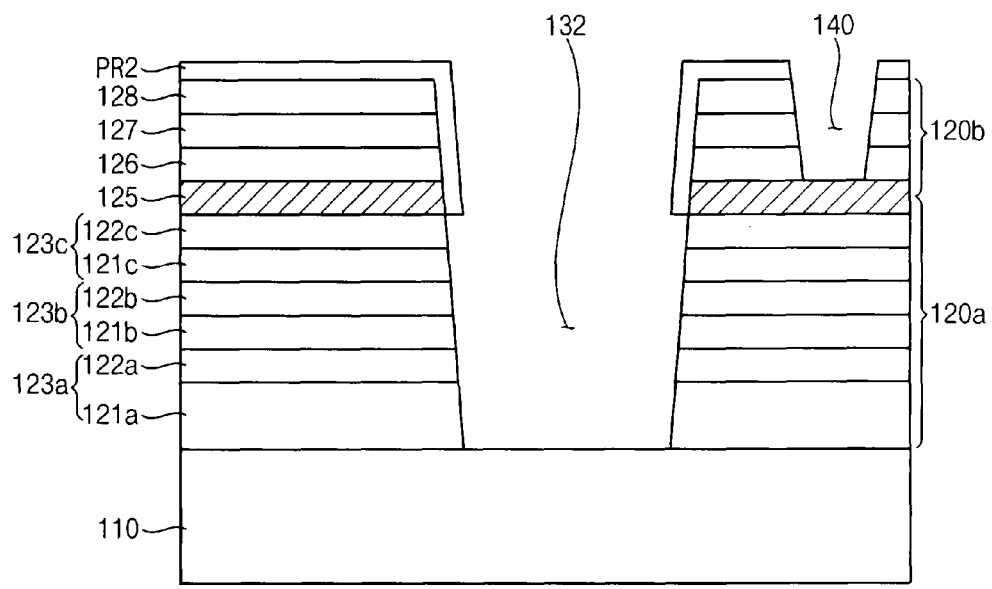

Referring to FIG. 5C, a portion of the high reflective layer 120a is removed to expose the first base substrate 110 through the first slot 131 so that a second slot 132 is formed, and at the same time, another portion of the low reflective layer 120b is removed to expose the metal light reflective layer 125 so that the contact hole 140 is formed.

In the illustrated embodiment, for example, a second photoresist film PR2 is disposed on the stacked reflective layer 120 in which the first slot 131 is formed, and areas of the second photoresist film PR2 corresponding to the second slot 132 and the contact hole 140 are patterned to form a second pattern. A pattern of the second slot 132 is correspondingly formed in an area in which the first slot 131 is formed, and a pattern of the contact hole 140 is formed in a peripheral area of the display substrate 100.

Then, the stacked reflective layer 120 is dry-etched using the second pattern. The portion of the high reflective layer 120a of the stacked reflective layer 120, for example, the first high and low refractive layers 121a and 122a, the second high and low refractive layers 121b and 122b, and the third high and low refractive layers 121c and 122c are removed in an area of the second slot 132 to expose the first base substrate 110 so that the opening slot 130 is formed. At the same time, the another portion of the low reflective layer 120b, for example, the second insulating layer 128, the light absorbing layer 127, the first insulating layer 126 are removed to expose the metal light absorbing layer 125 so that the contact hole 140 is formed. Then, the second photoresist film PR2 is processed by the ashing process and the strip process, so that the second photoresist film PR2 is removed.

Figure 5D:
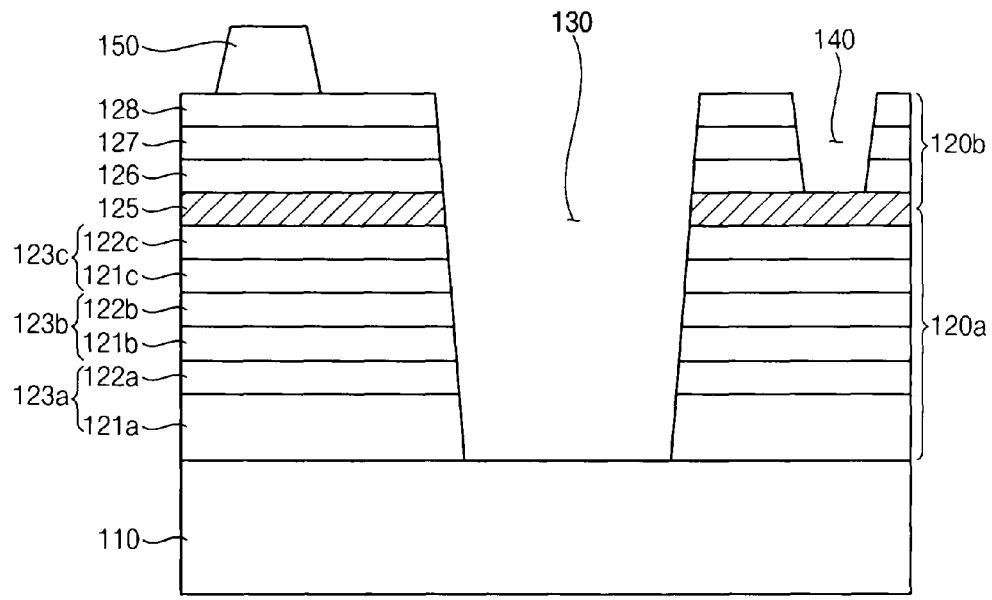

Referring to FIG. 5D, a bump 150 may be formed on the stacked reflective layer 120. In one embodiment, for example, a third photoresist film PR3 is disposed on the stacked reflective layer 120 on which the second slot 132 and the contact hole 140 are formed. Then, the third photoresist film PR3 except for an area corresponding to the bump 150 is exposed to the light and is developed, and the remaining third photoresist film PR3 is cured to form the bump 150.

In a method of manufacturing a display substrate according to the illustrated example embodiment, etching a thick stacked reflective layer to form an opening slot is divided into two times, and the contact hole is patterned together in a second etching, so that a processing error may be decreased.

In a conventional method of manufacturing, for example, a photoresist film has to be formed relatively thicker to etch a thick stacked reflective layer, an error is increased as a thickness of the photoresist film is increased, and thus a precise patterning is difficult. According to the illustrated example embodiment, when using a photoresist film having a standard thickness is used in a normal manufacturing method, the error may be decreased. In the embodiment of the invention, for example, etching a stacked reflective layer with a photoresist having a standard thickness is divided into at least two processes or steps.

In addition, in forming a stacked reflective layer on a display substrate for use with micro-electronic elements, reflective layers are stacked using silicon (Si), aluminum (Al), and titanium (Ti) materials using an equipment of a liquid crystal display ("LCD") device manufacturing line, so that replacement and alteration of an existing manufacturing equipment may be minimized.

According to example embodiments, in a high reflective layer, three double layers of silicon nitride ($SiN_x$) and silicon oxide ($SiO_x$) are employed to increase a reflectance, and a thickness of a first silicon nitride ($SiN_x$) layer is larger than a thickness of each of the other silicon nitride ($SiN_x$) layers, so that an area in which the reflectance is uniform may be increased in a visible-ray region. Accordingly, even if an error of thickness occurs during a manufacturing process, the reflectance may be less changed.

In addition, heavy metals such as chrome (Cr) are replaced with a multi-layer film including silicon nitride ($SiN_x$) and titanium (Ti), so that a low reflectance is more uniformized and pollution due to harmful heavy metals may be decreased.

In addition, etching a thick stacked reflective layer to form an opening slot is divided into two processes or steps, and the contact hole is patterned together in a second etching, so that a processing error may be decreased.

The foregoing is illustrative of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific example embodiments disclosed, and that modifications to the disclosed example embodiments, as well as other example embodiments, are intended to be included within the scope of the appended claims. The invention is defined by the following claims, with equivalents of the claims to be included therein.

What is claimed is:

1. A display substrate comprising:
   a base substrate;
   a high reflective layer on the base substrate, and comprising a high refractive layer and a low refractive layer which alternate with each other, the high refractive layer having a first refractive index, and the low refractive layer having a second refractive index smaller than the first refractive index;
   a low reflective layer comprising a light absorbing layer which absorbs a light, a first insulating layer on a first side of the light absorbing layer and having the second refractive index, and a second insulating layer overlapping an entire second side opposing the first side of the light absorbing layer and having the second refractive index; and
   a metal light reflective layer between the high reflective layer and the low reflective layer, wherein the metal light reflective layer reflects the light.

2. The display substrate of claim 1, wherein the high reflective layer sequentially comprises:
   a first high refractive layer on the base substrate and having the first refractive index;
   a first low refractive layer on the first high refractive layer and having the second refractive index;
   a second high refractive layer on the first low refractive layer and having the first refractive index;
   a second low refractive layer on the second high refractive layer and having the second refractive index;
   a third high refractive layer on the second low refractive layer and having the first refractive index; and
   a third low refractive layer on the third high refractive layer and having the second refractive index.

3. The display substrate of claim 2, wherein each of the first, second and third high refractive layers comprises silicon nitride ($SiN_x$).

4. The display substrate of claim 3, wherein a thickness of the first high refractive layer is larger than a thickness of each of the second and third high refractive layers.

5. The display substrate of claim 1, wherein each of the first and second insulating layers comprises silicon oxide ($SiO_x$).

6. The display substrate of claim 1, wherein the light absorbing layer comprises titanium (Ti).

7. The display substrate of claim 1, wherein the first refractive index is about 2.3, and the second refractive index is about 1.46.

8. The display substrate of claim 1, further comprising:
an opening slot which extends through the high reflective layer, the metal light reflective layer and the low reflective layer and exposes the base substrate, in a pixel area of the display substrate, and
a contact hole which extends through the low reflective layer and exposes the metal light reflective layer, outside of the pixel area.

9. The display substrate of claim 1, further comprising:
a bump on the low reflective layer.

10. A display apparatus, comprising:
a first substrate comprising:
a first base substrate,
a high reflective layer on the base substrate, and comprising a high refractive layer and a low refractive layer which alternate with each other, the high reflective layer having a first refractive index and the low refractive layer having a second refractive index smaller than the first refractive index, and
a low reflective layer comprising a light absorbing layer which absorbs a light, a first insulating layer on a first side of the light absorbing layer and having the second refractive index, and a second insulating layer overlapping an entire second side opposing the first side of the light absorbing layer and having the second refractive index,
a metal light reflective layer between the high reflective layer and the low reflective layer, wherein the metal light reflective layer reflects the light, and
an opening slot which exposes the first base substrate;
a second substrate comprising a shutter which opens and closes the opening slot of the first substrate;
an insulating material between the first and second substrates; and
a backlight unit under the first substrate, wherein the backlight unit generates and emits the light.

11. The display apparatus of claim 10, wherein the second substrate comprises:
a second base substrate;
a driving element which applies an electronic signal to move the shutter which opens or closes the opening slot;
a third insulating layer which covers the second base substrate and the driving element;
and
a shutter assembly on the third insulating layer, and comprising the shutter and an electrode portion, wherein the electrode portion is on opposing end portions of the shutter and moves the shutter to open or close the opening slot.

12. The display apparatus of claim 11, wherein the opening slot extends through the high reflective layer, the metal light reflective layer and the low reflective layer, in a pixel area of the first substrate.

13. A method of manufacturing a display substrate, the method comprising:
forming a high reflective layer comprising a high refractive layer and a low refractive layer which alternate with each other on a base substrate, the high refractive layer having a first refractive index, and the low refractive layer having a second refractive index smaller than the first refractive index;
forming a metal light reflective layer which reflects a light, on the high reflective layer; and
forming a low reflective layer comprising:
forming a first insulating layer having the second refractive index, directly on the metal light reflective layer;
forming a light absorbing layer, on the first insulating layer; and
forming a second insulating layer having the second refractive index, on the light absorbing layer.

14. The method of claim 13, wherein forming the high reflective layer comprises:
forming a first high refractive layer having the first refractive index, directly on the base substrate;
forming a first low refractive layer having the second refractive index, on the first high refractive layer;
forming a second high refractive layer having the first refractive index, on the first low refractive layer;
forming a second low refractive layer having the second refractive index, on the second high refractive layer;
forming a third high refractive layer having the first refractive index, on the second low refractive layer; and
forming a third low refractive layer having the second refractive index, on the third high refractive layer.

15. The method of claim 14, wherein
forming the first, second and third high refractive layers comprises forming a silicon nitride ($SiN_x$) layer using a plasma enhanced chemical vapor deposition method, and
forming the first, second and third low refractive layers comprises forming a silicon oxide ($SiO_x$) layer using the plasma enhanced chemical vapor deposition method.

16. The method of claim 13, wherein
forming the light absorbing layer comprises forming a titanium (Ti) layer using a plasma sputter deposition method, and
forming the first and second insulating layers comprises forming a silicon oxide ($SiO_x$) layer using a plasma enhanced chemical vapor deposition method.

17. The method of claim 13, further comprising:
removing a first portion of the metal light reflective layer and the low reflective layer in a pixel area to form a first slot.

18. The method of claim 17, wherein forming the first slot comprises:
forming a first photoresist film on the low reflective layer;
patterning an area of the first photoresist film corresponding to the first slot, to form a first pattern;
etching the low reflective layer and the metal light reflective layer using the first pattern; and
removing the first photoresist film.

19. The method of claim 17, further comprising:
at the same time,
removing a portion of the high reflective layer, to form a second slot through which the base substrate is exposed in the first slot; and
removing a second portion the low reflective layer, to form a contact hole through which the metal light reflective layer is exposed.

20. The method of claim 19, wherein the forming the second slot and the contact hole at the same time comprises:
- forming a second photoresist film on the first slot and the low reflective layer;
- patterning areas of the second photoresist film corresponding to the second slot and the contact hole, to form a second pattern;
- etching the high reflective layer on which the first slot is formed, and the low reflective layer, using the second pattern; and
- removing the second photoresist film.

21. The method of claim 19, further comprising:
forming a bump on the low reflective layer.

* * * * *